United States Patent [19]

Paquette

[11] Patent Number: 5,568,947
[45] Date of Patent: Oct. 29, 1996

[54] CLOTHES DRYER AIR EXHAUST DUCT WALL CONNECTOR

[76] Inventor: Claude Paquette, 532, rue de l'Église, St-Luc de Vincennes Québec, Canada, G0X 3K0

[21] Appl. No.: 373,698

[22] Filed: Jan. 17, 1995

[51] Int. Cl.⁶ .............................. F16L 5/00; E04F 17/04; F24F 13/08
[52] U.S. Cl. ............................ 285/46; 285/192; 285/331; 34/235; 52/220.8; 52/302.1; 454/359; 454/347
[58] Field of Search ............................ 285/331, 46, 192, 285/424; 52/220.8, 302.1, 198, 199; 34/235; 454/359, 347, 353

[56] References Cited

U.S. PATENT DOCUMENTS

| | | |
|---|---|---|
| 3,123,939 | 3/1964 | Erickson . |
| 3,988,030 | 10/1976 | Twedell ............................... 285/424 X |
| 4,081,915 | 4/1978 | Materniak et al. . |
| 4,237,621 | 12/1980 | Boismenu . |
| 4,313,286 | 2/1982 | Harbeke ............................... 52/220.8 |
| 4,372,585 | 2/1983 | Evora .................................. 285/331 X |
| 4,596,181 | 6/1986 | Kolt ........................................ 454/359 |
| 5,145,217 | 9/1992 | Anderson et al. ...................... 285/424 |
| 5,199,190 | 4/1993 | Mayer et al. ....................... 285/183 X |
| 5,293,920 | 3/1994 | Vagedes ............................. 52/302.1 X |
| 5,390,967 | 2/1995 | Gooderham et al. ............... 285/331 X |

FOREIGN PATENT DOCUMENTS

| | | |
|---|---|---|
| 1240548 | 8/1988 | Canada . |
| 1744218 | 6/1992 | U.S.S.R. ............................... 52/302.1 |

*Primary Examiner*—Terry Lee Melius
*Assistant Examiner*—Heather Chun Shackelford
*Attorney, Agent, or Firm*—François Martineau; Pierre Lespérance

[57] ABSTRACT

A wall connector for connecting a clothes dryer air outflow duct to outside ambiant air through a building external wall. The connector includes: a rigid tubular main body, extending through and mounted into an aperture in the building wall; an inner end portion, sized to fit about the dryer air duct outer end mouthpiece in substantially air-tight fashion; and an outer end portion, of double wall construction, wherein a peripheral cavity is formed thicknesswisely of said main body, the peripheral cavity defining an end mouth opening to outside ambiant air. A hood fits against the exterior face of the building wall, and includes: an inner tubular section, releasably engaging through the peripheral cavity of the connector main body, and louvers, for preventing air inflow from ambiant air into the connector main body.

10 Claims, 1 Drawing Sheet

U.S. Patent     Oct. 29, 1996     5,568,947
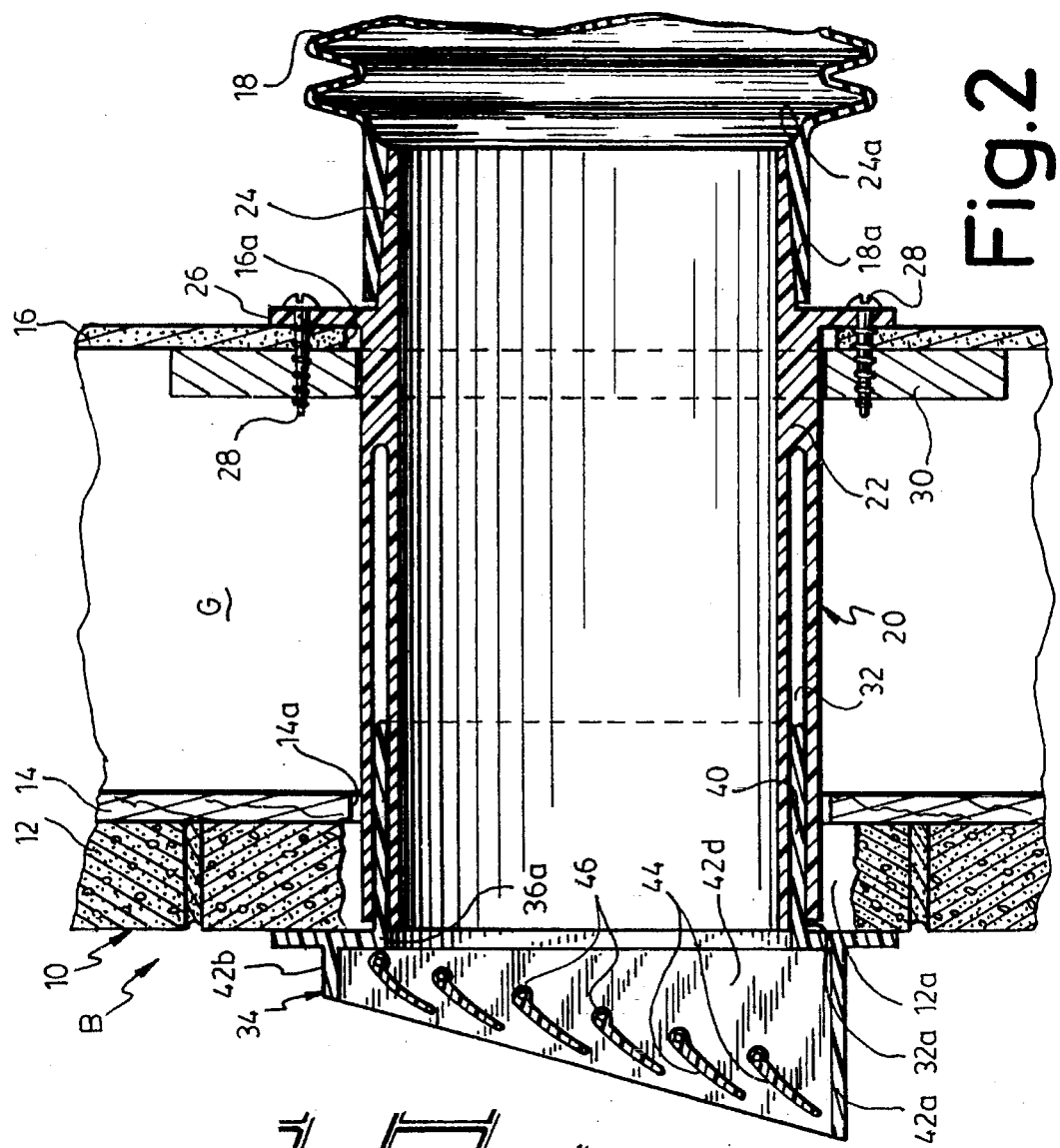
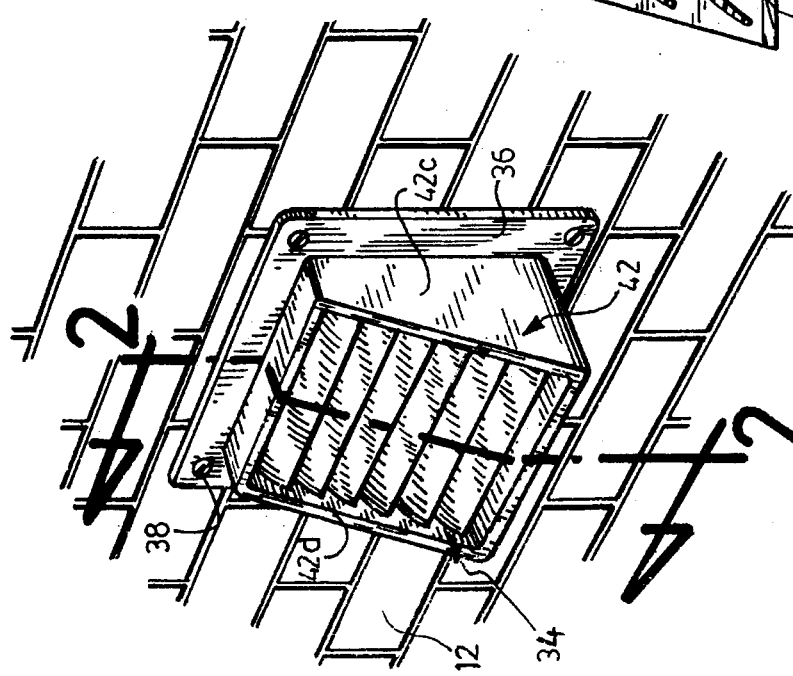

CLOTHES DRYER AIR EXHAUST DUCT WALL CONNECTOR

FIELD OF THE INVENTION

This invention relates to connectors for mounting the flexible air outflow duct of a clothes dryer through a wall of a building, while preventing undesirable air inflow leaks.

BACKGROUND OF THE INVENTION

U.S. Pat. No. 3,123,939 issued March 1964 to the Generic Electric Company, discloses a connector system for mounting to a building wall the exhaust air duct from a clothes dryer. The exhaust air duct is anchored to the building wall by spaced annular flanges, which come in contact with a reinforcing panel, so that an intermediate chamber is defined between the annular flanges.

Canadian patent No. 1,240,548 issued 14 Aug. 1988 to Raymond CHOUINARD, shows at FIG. 1 the concept of providing a cylindrical housing for air exhaust from a clothes dryer, comprising a pair of sealing rings at its two opposite ends, being in contact with the cylindrical opening in the building wall.

One problem with these known wall connectors for mounting the outer end of a clothes dryer exhaust air duct to a building wall, is the difficulty of repairing the damaged external hood thereof. Indeed, it is a time-consuming operation, since for replacing the hood, it is usually required that the combination of the external hood and integral interior connector body needs to be pulled out from the building wall; or if the hood is detached from the cylindrical connector body, removal of the combined hood-connector body from the building wall usually leads to structural damage being made about the marginal wall section surrounding the wall aperture into which the connector body is mounted.

Before a fresh wall connector has been installed, a bricklayer has to repair the marginal brick wall portion—an additional labour cost expense. After installation of the fresh wall connector, new caulking must be applied around the hood, to seal the joint between the hood and the building wall. Also, during repairs in cold weather, condensation may occur between the brick wall and gyproc wall, and this condensation may eventually lead to structural damage to the building and\or to the inside furniture of the occupant. Finally, for the worker himself, the working conditions are often harsh in cold sub-freezing winter months, when he has to work outside the house with his feet deep into snow.

A second drawback of existing clothes dryer air exhaust duct wall connectors is that, during early construction phase of the building when only the outer brick wall is being laid exclusively of the inner finish gyproc wall, it will not be possible for the bricklayers to install the connector and the hood in a permanent fashion. This will have to be done at a later step of building construction, when the bricklayers will have to come back later for completing the installation job of the hood, thus again increasing labour costs. Indeed, during installation of the gyproc wall, it is understood that the connector will have to be temporarily removed; removal of connector will be effected by pulling same interiorly. Accordingly, the gap between the exterior brick wall and the interior gyproc wall will again become exposed to outside ambiant air, leading to air inflow leaks. In cold winter months, this leads to undesirable condensation between the brick wall and gyproc wall.

OBJECTS OF THE INVENTION

The gist of the invention is therefore to address the problems outlined in the preceeding background of the invention paragraph.

A general object of the invention is to reduce labour costs and to improve the working conditions associated with repairing a damaged connector hood of a wall connector for clothes dryer exhaust air duct.

SUMMARY OF THE INVENTION

In accordance with the teachings of the invention, there is disclosed a wall connector for connecting a clothes dryer air outflow duct to outside ambiant air through a building external wall, said dryer air duct being of the type having an outer end rigid mouthpiece; said wall connector consisting of:

(a) a rigid tubular main body, adapted to extend through and be mounted into an aperture in said building wall, said connector main body defining a through-channel, for free through passage of moist air expelled from the clothes dryer; an inner end portion, sized to fit about said dryer outer mouthpiece in substantially fluid-tight fashion; and an outer end portion, of double wall construction, wherein a peripheral cavity is formed thicknesswisely of said main body, said peripheral cavity defining an end mouth opening to outside ambiant air; and (b) a hood member, defining a main open frame, adapted to fit against the exterior face of said building wall, an inner tubular section, releasably engaging through said cavity end mouth and into said peripheral cavity of the connector main body, and outer air inflow control means, for preventing air inflow from ambiant air through said connector main body and into said building.

The connector tubular body may be cylindrical; may also have a substantially constant internal diameter; and preferably further includes a peripheral lip, radially outwardly depending from said connector tubular body integrally thereof and adapted to be anchored by screw means to the interior face of said building wall portion.

The hood air inflow control means preferably consists of quadrangular louver members, pivotally carried along vertically spaced horizontal axles in edgewisely outwardly overlapping successive pairs.

BRIEF DESCRIPTION OF THE DRAWINGS

FIG. 1 is a perspective fragmentary view of the outside upright wall of a building, showing an air vent hood; and FIG. 2 is a vertical sectional view of the building wall portion of FIG. 1, taken along line 2—2 of FIG. 1, and of the air vent wall connector assembly according to a preferred embodiment of the invention.

DETAILED DESCRIPTION OF THE DRAWINGS

The upright wall member 10 of a building B illustrated in the figures, conventionally includes an outer brick wall 12, an intermediate wooden panel 14 applied directly against brick wall 12, and an inner decorative wall 16 (usually a frangible finish wall such as gyproc-made) mounted spacedly from the intermediate wooden panel 14 by known spacer members (not shown). Usually, a thermal insulating sheet material, e.g. mineral wool (not shown), fills the gap G between intermediate wall 14 and inner wall 16, particularly in sub-freezing climatic environments. A clothes dryer (not shown), located inside a room of the building B, is connected to wall member 10 by its conventional flexible air outlet hose 18. Humid air exhaust hose 18 is preferably of accordion-like construction, as shown, and includes a rigid annular mouthpiece 18a at its outer end. Mouthpiece 18a is to be mounted against the inner face of wall 16, in register with and sized correspondingly to horizontally registering wall apertures 16a, 14a, 12a, of wall members 16, 14, 12, respectively.

Now, in accordance with the teachings of the invention, there is provided a tubular wall connector member 20 adapted to extend through and sized to fit within the three bores 12a, 14a and 16a, and of a length greater than the distance between inner and outer walls 16, 12, so as to straddle all three walls 12, 14 and 16. Connector member 20 is preferably cylindrical, as shown, although other tubular shapes, e.g. cross-sectionally quadrangular, are envisioned to be well within the scope of the present invention. Connector member 20 includes a main cylindrical body 22, being preferably of substantially constant internal diameter. The inner end portion 24 of cylindrical body 22 tapers thicknesswisely, so that an innermost mouth 24a is defined. Mouth 24a has an external diameter smaller than that of main body 22. Tapered end portion 24 of connector member 20 is adapted to project interiorly beyond inner wall 16, and is sized to engage through and frictionally fit within rigid end mouthpiece 18a of the clothes dryer flexible hose 18, whereby connector member 20 and flexible air duct 18 become interconnected in substantially air-tight fashion. Preferably, a radially outturned annular lip 26 is provided integrally to connector member main body 22, adjacent tapered end portion 24. Annular lip 26 is diametrally larger than bore 16a, whereby lip 26 is anchored to inner wall 16 by a number of screws 28 so as to secure the inner portion of connector member 20 to the wall 16, for connector body 20 to remain transverse to walls 12–16. Preferably, in view of the usually frangible nature of gyproc wall 16, an annular reinforcement rigid panel 30 is provided against the external face of wall 16 and around connector body 22. Screws 28 engage through panel 30, which may preferably consist of wood.

According to the heart of the invention, the connector main body 22 is of double wall construction, whereby an annular cavity 32 is made thicknesswisely of the connector main body 22. Cavity 32 extends short of tapered inner end portion 24, and opens outwardly at the exterior end of connector member 20, about mouth 32a. With connector member 20 being anchored to walls 16 and 30 by screws 28, the length of connector main body 22 is such that mouth 32a of cavity 32 is located flush with, or slightly interiorly offset (as illustrated in FIG. 2) relative to the exterior face of brick wall 12.

An external hood member 34 is operatively attached to the exterior end of connector 20. Hood member 34 includes a quadrangular open frame panel 36, adapted to flatly abut against the exterior face of brick wall 12, and to be anchored thereto with bolt means 38. A transverse tubular (preferably cylindrical), interior, rigid nipple 40 is transversely carried integrally by panel 36, and is sized to engage through mouth 32a and into cavity 32 and to frictionally interlock into annular cavity 32 with connector body 22. Panel 36 defines a main aperture 36a, for free air through-outflow. Panel 36 also carries a transverse, tubular, exterior channel member 42. Channel member 42 is diametrally larger than nipple 40, and is preferably of irregular shape, as illustrated, with a wider bottom section 42a, a narrower top section 42b, and a pair of upwardly tapering side sections 42c, 42d. A number of airflow inflow controlling louvers 44 are pivotally carried by pivotal axles 46 to the side walls 42c, 42d, of channel member 42. Louvers 44 edgewisely overlap one another in successive vertically spaced pairs, with the uppermost louver being adjacent to the top segment of panel 36, and with the lowermost louver being adjacent to or in contacting engagement with the bottom wall 42a of channel member 42. Each rectangular louver member 44 is outwardly convex and is adapted to pivot in an upwardly outward direction. Hence, without an air outflow through aperture 36, louvers 44 are closed (i.e. extend substantially vertically) under simple gravity-borne forces, and thus prevent undesirable outside air inflow through aperture 36 and into tube 18 via connector 22. During moist air outflow from the clothes dryer, and as suggested in FIG. 2 of the drawings, louvers 44 are at least partially pivoted outwardly and upwardly about their pivot axles 46, yieldingly to the air flow.

Although the annular cavity 32 made in connector body 22 is shown to be of constant radial thickness throughout its axial length, this is not considered to be a limitation; other suitable arrangements are also envisioned, e.g. that the radial thickness of the annular cavity 32 could taper toward the interior portion 24 of the connector member 20, so that the hood nipple 40 would then become locked by wedge action inside annular cavity 32, instead of by simple friction fit interlocking action.

With the present connector member 20, it is a simple matter to replace a damaged hood 42 (i.e. a damaged louver 44), simply by forcibly pulling out by hand the hood member 42, exteriorly away from wall 12, to release cylindrical nipple 40 from annular channel 32, and replacing this hood by a fresh one. It is noted that the bolts 38 are required only during construction of the building and thus can be removed once building construction has been completed.

It is understood that, during early construction phase of the building B when only the outer brick wall 12 is being laid exclusively of the inner gyproc wall 16, it will be possible for the bricklayers to concurrently make the opening 12a and install in a permanent fashion the connector 24 and the hood 34. This will be first of all very efficient, since the bricklayers will not have to come back later for completing the installation job of the hood, thus reducing costs. Moreover, during installation of the gyproc wall 16 at a later construction phase of the building B, it is understood that the connector 20 will have to be temporarily removed; removal of connector 20 will be effected by pulling same interiorly, so that hood annular lip 40 release annular cavity 32 of the connector body 22; because the hood frame panel 36 is temporarily anchored by bolt means 38 to brick wall 12, the hood 34 will remain anchored against the brick wall 12, thus maintaining exterior aperture 12a, 14a, in airtight sealed condition against accidental undesirable air leaks from ambiant air.

I claim:

1. A wall connector for connecting a clothes dryer air outflow duct to outside ambiant air through a building external wall hole, the dryer air duct being of the type having an outer end rigid mouthpiece; said wall connector consisting of a rigid cylindrical tubular main body, adapted to extend through and be mounted into an aperture in the building wall; wherein said connector main body defines:

(a) a through-channel, for free through passage of moist air expelled from the clothes dryer;

(b) an inner end portion, sized to fit Within the dryer outer mouthpiece for interlocking engagement therewith in substantially fluid-tight fashion;

(c) an outer end portion, of double wall construction, wherein a peripheral annular cavity is formed thicknesswisely of said main body, said peripheral cavity defining a free end mouth; said peripheral cavity adapted to be releasably engaged by a complementary tubular section from an air inflow control hood member;

(d) a radially inward surface of substantially constant diameter all along said wall connector; and (e) a radially outward surface of substantially constant diameter all along said wall connector, except at said inner end portion thereof;

wherein said wall connector main body radially outward surface is sized to be just slightly smaller than building wall hole, which facilitates retrofit installation of said wall connector to an existing building wall.

2. A wall connector as defined in claim 1, further including a peripheral lip, radially outwardly depending from said connector tubular body integrally thereof and adapted to be anchored by screw means to the interior face of said building wall.

3. A wall connector for connecting a clothes dryer air outflow duct to outside ambiant air through a building external wall, the dryer air duct being of the type having an outer end rigid mouthpiece; said wall connector consisting of:

(a) a rigid tubular main body, adapted to extend through and be mounted into an aperture in the building wall, said connector main body defining a through-channel, for free through passage of moist air expelled from the clothes dryer, an inner end portion, sized to fit within the dryer outer mouthpiece for interlocking engagement therewith in substantially air-tight fashion, and an outer end portion, of double wall construction, wherein a peripheral cavity is formed thicknesswisely of said main body, said peripheral cavity defining a free end mouth; and (b) a hood member, defining a main open frame, adapted to fit against the exterior face of the building wall, an inner tubular section, releasably engaging through said cavity end mouth and into said peripheral cavity of the connector main body, and outer air inflow control means, for preventing accidental air inflow from ambiant air through said connector main body and into the building.

4. A wall connector as defined in claim 3, wherein said hood air inflow control means consists of quadrangular louver members, pivotally carried along vertically spaced horizontal axles in edgewisely outwardly overlapping successive pairs.

5. A wall connector as defined in claim 3, wherein said connector main body is cylindrical, and said peripheral cavity is correspondingly annular.

6. A wall connector as defined in claim 3, further including a peripheral lip, radially outwardly depending from said connector tubular body integrally thereof and adapted to be anchored by screw means to the interior face of the building wall.

7. A wall connector as defined in claim 5, wherein said connector annular cavity includes means for interlocking said connector main body and said hood member.

8. A wall connector as defined in claim 7, wherein said connector peripheral cavity is of constant radial thickness along its axial length, and said interlocking means consists of a friction fit relative sizing of said hood member inner section and of said connector body annular cavity.

9. A wall connector as defined in claim 1, wherein said connector annular cavity includes means for interlocking said connector main body and said hood member.

10. A wall connector as defined in claim 9, wherein said connector peripheral cavity is of constant radial thickness along its axial length, and said interlocking means consists of a friction fit relative sizing of said hood member inner section and of said connector body annular cavity.

* * * * *